United States Patent [19]

Hashemi et al.

[11] 4,139,731
[45] Feb. 13, 1979

[54] TELEPHONE CONFERENCE SYSTEM WITH ACTIVE ANALOG CONFERENCE

[75] Inventors: Mike A. Hashemi, Bolingbrook; Gregory P. Pucci, Westmont, both of Ill.

[73] Assignee: Wescom, Inc., Downers Grove, Ill.

[21] Appl. No.: 832,788

[22] Filed: Sep. 12, 1977

[51] Int. Cl.² .............................................. H04M 3/56
[52] U.S. Cl. ............................. 179/1 CN; 179/18 BC
[58] Field of Search ............ 179/1 CN, 1 VC, 18 BC, 179/1 HF, 170 D

[56] References Cited

U.S. PATENT DOCUMENTS

| | | | |
|---|---|---|---|
| 3,026,374 | 3/1962 | Hilliard et al. | 179/1 VC |
| 3,060,265 | 10/1962 | Duncan et al. | 179/1 CN |
| 3,135,829 | 6/1964 | Hultberg | 179/1 CN |
| 3,730,995 | 5/1973 | Mathews | 179/1 VC |
| 3,824,344 | 7/1974 | James et al. | 179/1 CN |
| 3,891,801 | 6/1975 | Wang | 179/1 CN |

Primary Examiner—Kathleen H. Claffy
Assistant Examiner—Gerald L. Brigance
Attorney, Agent, or Firm—Leydig, Voit, Osann, Mayer & Holt, Ltd.

[57] ABSTRACT

A telephone conference system includes a conference bridge for coupling multiple conference ports associated with corresponding conference stations. The bridge includes means for summing incoming signals from all the conference ports and supplying the summed signals to all the conference ports. A differential amplifier is connected to each of the conference ports and differentially receives (1) incoming signals at the corresponding conference port and (2) the output of the summing means so as to cancel from the output of the summing means any signal received by the summing means from the corresponding conference port. Thus, the differential amplifier passes only that portion of the output of the summing means that is received from conference ports other than the particular port to which that differential amplifier is connected. A voice actuated switch is connected to each conference port for controlling the transmission of incoming audio signals to the respective ports, and the number of switches that can be closed at the same time is limited to a preselected maximum, while permitting the continuous transmission of outgoing audio signals from all the ports regardless of which switches are open or closed.

9 Claims, 5 Drawing Figures

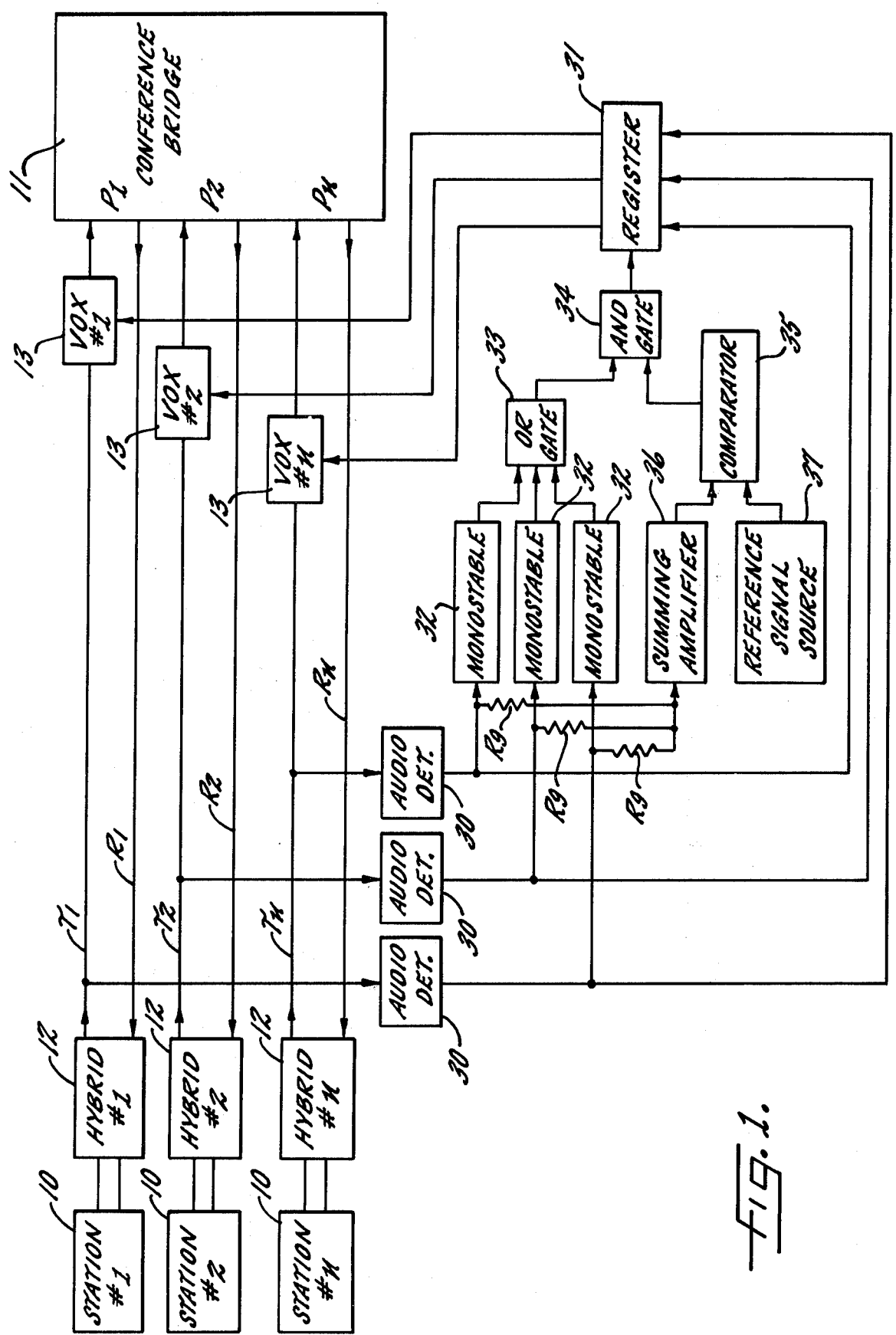

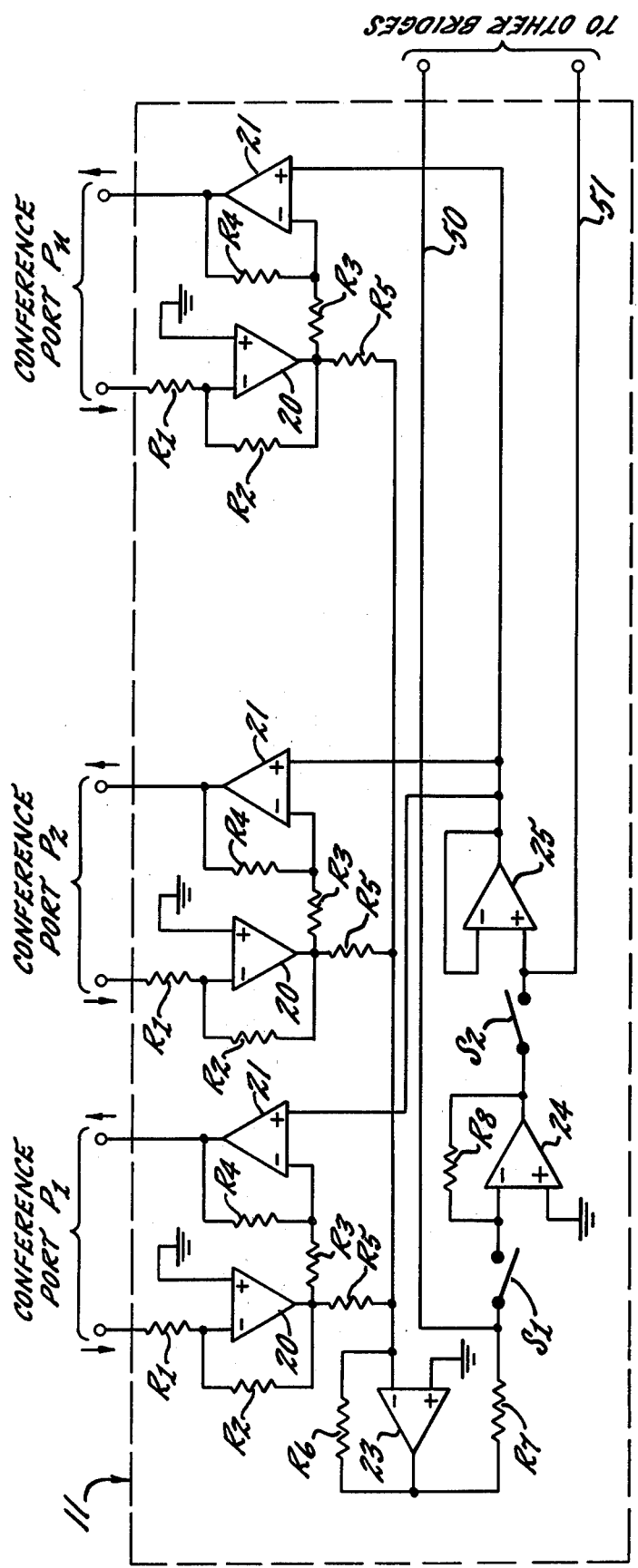
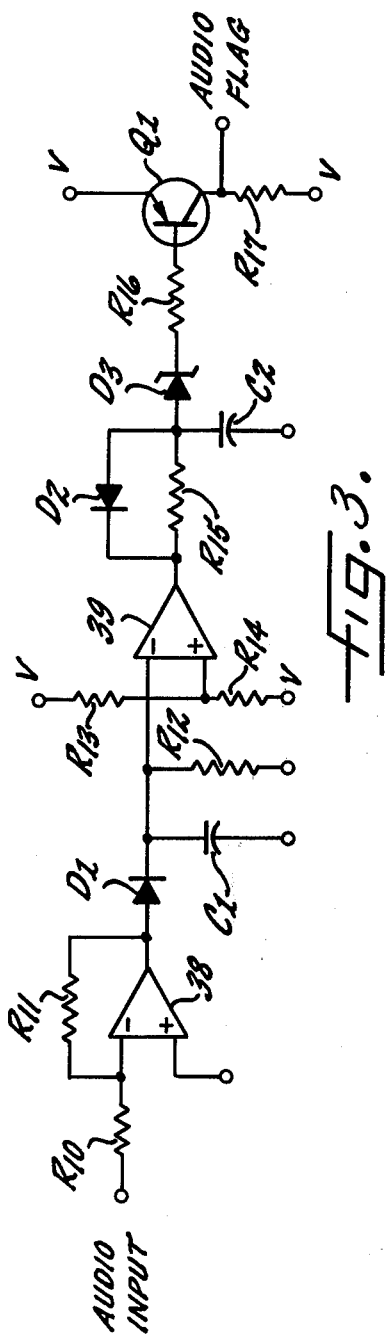

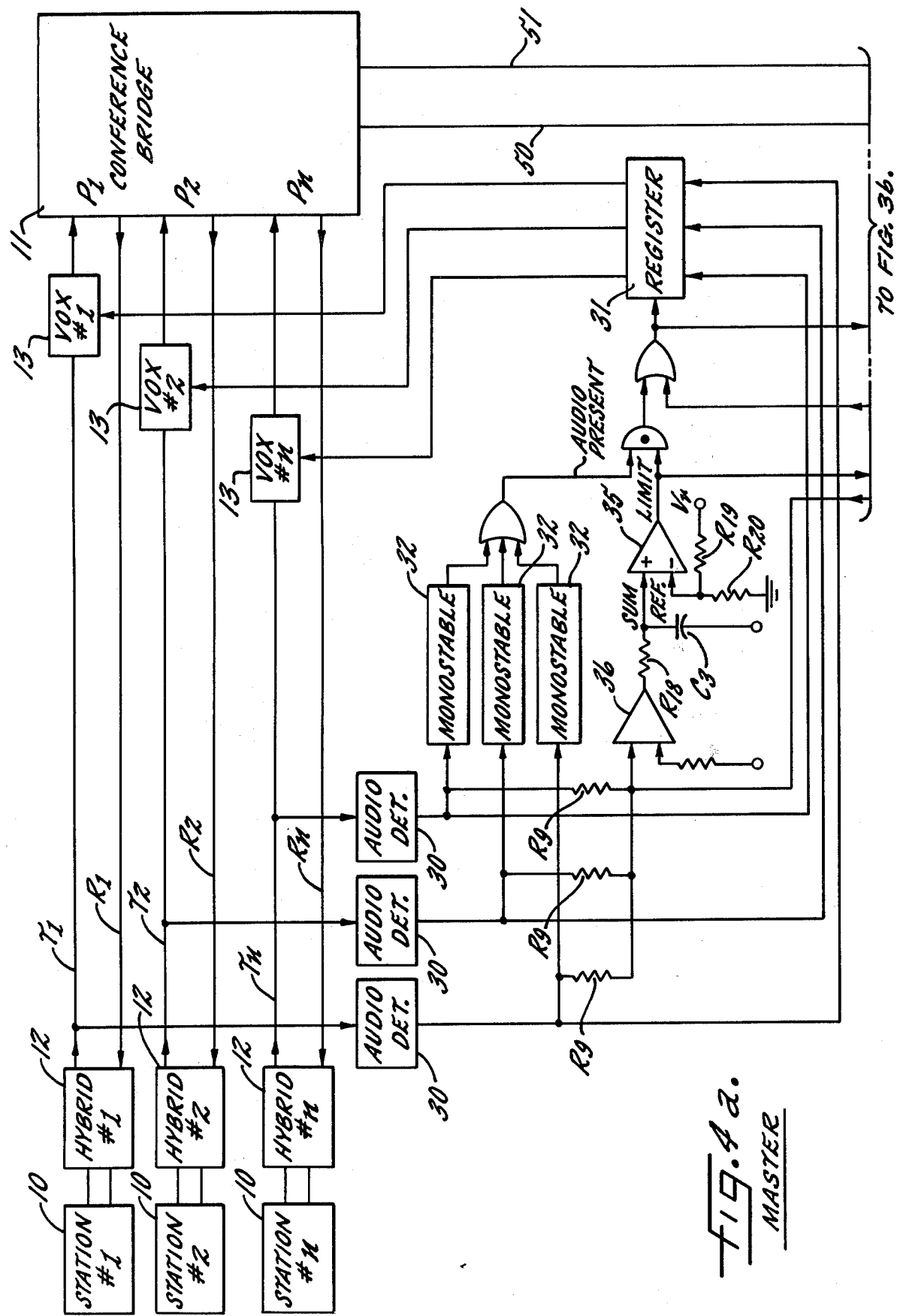

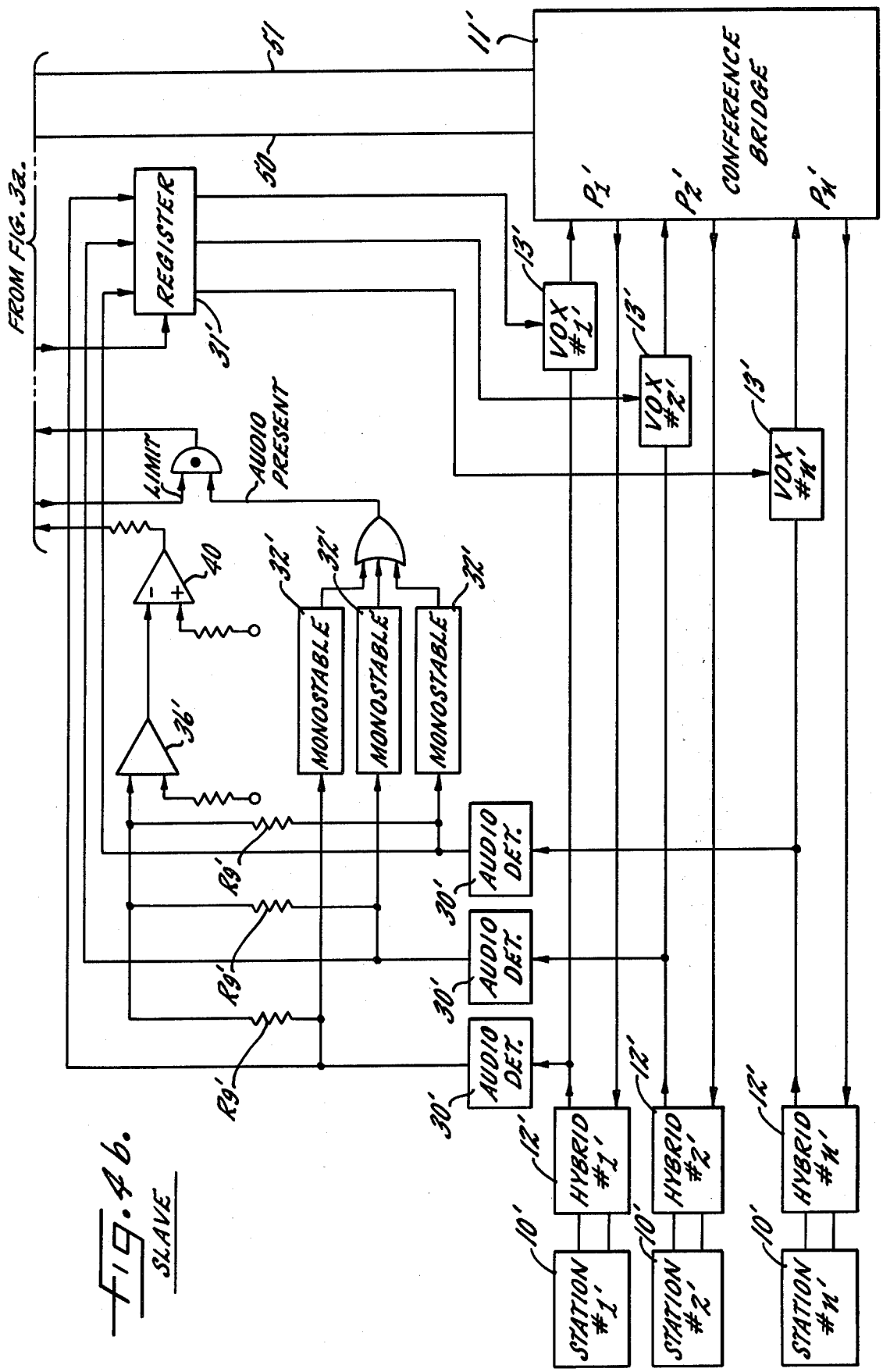

TELEPHONE CONFERENCE SYSTEM WITH ACTIVE ANALOG CONFERENCE

DESCRIPTION OF THE INVENTION

The present invention relates generally to telephone conference systems and, more particularly, to telephone conference systems that employ active analog conference bridges for coupling multiple conference stations to each other.

It is a primary object of the present invention to provide a telephone conference system that can accommodate any desired number of conference stations without degrading the quality or level of the transmitted signals and without loss of stability in the conference bridge. In this connection, one specific object of the invention is to provide such an improved telephone conference system which does not produce singing or other adverse effects that interfere with signal transmission.

It is another object of this invention to provide an improved telephone conference system of the foregoing type which includes an active analog conference bridge that introduces substantially zero loss into the conference system regardless of the number of conference ports connected to the system.

A further object of the invention is to provide such an improved telephone conference system that includes an active analog conference bridge that remains stable regardless of the transhybrid losses at the conference ports.

A still further object of the invention is to provide such an improved telephone conference system that permits multiple conference ports to be accessed to the bridge at the same time without producing objectionable feedback through any given port.

Yet another object of this invention is to provide such an improved telephone conference system that can be efficiently manufactured and used in a wide variety of different applications at a relatively low cost.

Other objects and advantages of the invention will be apparent from the following detailed description and the accompanying drawings, in which:

FIG. 1 is a block diagram of a telephone conference system embodying the invention;

FIG. 2 is a circuit diagram of the conference bridge included in the system of FIG. 1;

FIG. 3 is a circuit diagram of one of the audio detectors included in the system of FIG. 1; and FIGS. 4aa and 4b is a more detailed schematic diagram of one exemplary embodiment of the conference system illustrated in FIG. 1.

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined in the appended claims.

Turning now to the drawings and referring first to FIG. 1, there is illustrated a telephone conference system having n conference stations 10 connected to a conference bridge 11 via n hybrids 12. In the illustrative system, the stations 10 are all two-wire stations, and thus the hybrids 12 are needed to interface these stations with the four-wire ports P1, P2 ... Pn of the conference bridge 11. In a system where four-wire stations are used, the hybrids 12 can be eliminated and the stations connected directly to the ports of the conference bridge. The bridge ports P1, P2 ... Pn receive signals from the transmit lines T1, T2 ... Tn of the respective hybrids 12, and return signals on the receive lines R1, R2 ... Rn of the respective hybrids. As will be apparent from the ensuing description, the illustrative conference system can be used with virtually any desired number of conference stations and ports, although only three such stations and ports have been shown in the drawings in order to facilitate the description thereof.

As is well known in the telephone system art, the basic purpose of a conference bridge is to couple an incoming signal at any conference port to all the other conference ports, but without feeding that signal back to the port at which it is received. These incoming signals, which of course originate at the stations 10, will be referred to herein as the "audio" signals, but it is to be understood that the illustrative conference system is also applicable to the transmission of data in digital form. Transmission of an audio signal from any given station 10 to its corresponding port P is controlled by a voice-actuated switch 13 (a "VOX") connected in the transmit line T leading from each hybrid 12 to the corresponding port P in the bridge. Thus the switches 13 determine which of the stations 10 is "turned on," i.e., accessed to the bridge 11 in the transmit direction, at any given time. In the receive direction, all the stations 10 continuously receive all the signals passing through the bridge.

In accordance with one important aspect of the present invention, the conference bridge 11 is an active analog bridge comprising means for summing signals from all the conference ports and supplying the summed signals to all the conference ports, and a plurality of differential amplifiers each of which is connected to one of the conference ports and differentially receives (1) incoming signals at the corresponding conference port and (2) the output of the summing means so as to cancel from the output of the summing means any signal received by the summing means from the corresponding conference port, whereby each differential amplifier passes only that portion of the output of the summing means that is received from conference ports other than the particular port to which that differential amplifier is connected. Thus, referring to FIG. 2, incoming signals at each of the conference ports P1, P2 ... Pn are passed through a resistor R1 and an amplifier 20 to the inverting input of a differential amplifier 21 whose output is connected to the receive line R of the corresponding hybrid 12. The principal purpose of the amplifier 20 at each port is to provide a signal source with a low output impedance. The gain of each amplifier 20 is controlled by a feedback resistor R2, which is typically selected to provide a gain of unity. The output of each amplifier 20 is fed to the differential amplifier 21 through a resistor R3 so that the magnitude of the input signal to the inverting input of the amplifier 21 is less than the magnitude of the output from the amplifier 20 because of the drop across the resistor R3. For example, the magnitude of the input to the amplifier 21 from resistor R3 is typically about half of the magnitude of the output signal from the amplifier 20. The gain of the amplifier 21 is controlled by a feedback resistor R4, which is selected to provide a gain that produces a bridge output signal with the same amplitude as the corresponding input signal or signals.

For the purpose of summing the incoming signals from all the conference ports P1, P2 ... Pn, the outputs of all the amplifiers 20 are connected via resistors R5 to a summing amplifier 23. The gain of the summing amplifier 23 is controlled by a feedback resistor R6, and is typically set to provide unity gain. From the summing amplifier 23, the summed audio signals are supplied via a resistor R7 to the inverting input of an amplifier 24 which adjusts the phase and amplitude of the summed signals to permit cancellation of individual components thereof in the differential amplifier 21. More specifically, the amplifier 24 inverts the output of the summing amplifier 23 so that the output of the amplifier 24 is in phase with the output of the amplifier 20, which is inverted by the summing amplifier 23 before it reaches the amplifier 24. The gain of the amplifier 24 is set by a feedback resistor R8 so that the amplitude of each individual component of the composite sum signal at the output of the amplifier 24 is the same as the amplitude of that same individual signal as delivered to the inverting input of the differential amplifier 21 at the particular port where that signal is received by the bridge. Consequently, when the output of the amplifier 24 is delivered to the non-inverting inputs of all the differential amplifier 21, the individual audio signal received by any given port is cancelled from the composite sum signal fed to the differential amplifier 21 at that particular port from the amplifier 24. Thus, the signal that is transmitted back to each conference station 10 on its receive line R includes only the signals derived from the other conference stations, so that a speaker at any conference station never hears his own voice being fed back to him.

It will be appreciated that the operation described above is the same for all the conference ports, regardless of how many ports are included in the system. That is, the incoming signals from all the ports P1, P2 . . . Pn are fed to a single summing amplifier 23, and each port has its own separate differential amplifier 21 for cancelling the incoming signal at that port from the outgoing sum of signals transmitted through its amplifier 21 back to the corresponding conference station 10. The bridge can be easily expanded to accommodate virtually any desired number of conference stations because the number of stations connected to the bridge does not affect the loss through the bridge. Indeed, as viewed from the input and output terminals of each conference port P, the loss through the bridge is substantially zero, and this remains true regardless of the number of conference ports included in the bridge. Furthermore, there is substantially no degradation of the quality of the audio signals as they are passed through the bridge.

In accordance with another aspect of the present invention, the voice-actuated switches between the conference stations and the conference ports in the bridge are controlled so that the number of stations that can transmit audio signals to the bridge at the same time is limited to a preselected maximum. The major factor limiting stability of the conference bridge 11 is transhybrid loss (four-wire return loss) of the two-wire/four-wire hybrids 12 used with two-wire conference stations, or the amount of feedback between the receive and transmit lines in the case of four-wire stations. Thus, a fraction of each outgoing signal from the output terminal of a conference port will return to its input terminal due to transhybrid loss or feedback. All of these return signals are summed in the summing amplifier along with all other incoming signals, and supplied to the differential amplifiers 21 of all the conference ports. Consequently, if a sufficient number of conference stations 10 are connected to the bridge, and if transhybrid losses in the hybrids 12 are sufficiently poor, the gain from the input terminal to the output terminal of a given port P could exceed the transhybrid loss of the hybrid 12 associated with that particular port and thereby render the bridge unstable. Such instability would give rise to "singing" which would degrade the quality of the audio signals passing through the bridge.

However, by limiting the number of conference stations that are permitted to transmit into the bridge 11 at any given time, this instability can be avoided. For a typical worse case transhybrid loss of 8dB, it is preferred to limit the maximum number of conference stations that can simultaneously transmit into the bridge to three or four so that the cumulative gain from the input terminal to the output terminal of any given port P cannot exceed the transhybrid loss of the hybrid 12 associated with that port. This allows the bridge to be expanded to accommodate any desired number of conference stations without endangering the stability of the bridge, even though the output terminals of all the conference ports P remain active at all times.

In the particular system illustrated in FIG. 1, the voice-actuated switches 13 are turned on and off in response to the presence and absence, respectively, of audio signals on the respective transmit lines T to which the switches 13 are connected, as long as the number of switches closed at any given time is less than a preselected maximum. When the number of closed switches reaches the preselected maximum, all the remaining open switches are prevented from closing. Thus, the normal opening and closing of the switches 13, when less than the preselected maximum number of switches are closed, is controlled by digital signals derived from audio detectors 30 each of which is connected to one of the transmit lines T1, T2 . . . Tn. The digital output of these audio detectors 30 goes from low (representing a binary "0") to high (representing a binary "1"), whenever the audio signal on the corresponding transmit line T exceeds a predetermined threshold level set by the audio detector, and the detector output remains at the "1" level as long as the corresponding audio signal remains above the threshold level. The outputs of all the audio detectors 30 are fed into a register 31 which is clocked each time a new audio signal appears on one of the transmit lines T, and each clocking of the register 31 transfers the new set of "1"'s and "0"'s from the detectors 30 to the corresponding voice-actuated switch 13. Those switches 13 that receive "0"'s from the register 31 are opened (or remain open), and those switches that receive "1"'s are closed (or remain closed).

The locking pulses for the register 31 are generated each time one of the outputs from the audio detectors 30 changes from a "0" to a "1", i.e., each time a new audio signal appears on one of the transmit lines T. Thus, the output of each detector 30 is connected to a monostable multivibrator 32 which generates a pulse capable of clocking the register 31 each time the detector output changes from "0" to "1". These pulses from the multivibrators 32 are supplied to the clock input of the register 31 through an OR gate 33 and an AND gate 34. As long as the number of closed switches 13 is less than the preselected maximum, the AND gate 34 is enabled by a binary "1" signal from a comparator 35 so that the pulses from the multivibrators 32 are passed through the gate 34 to clock the register 31 each time a new audio signal appears on one of the transmit lines T1, T2 . . . Tn.

For the purpose of disabling the AND gate 34 when the number of closed switches 13 reaches the preselected maximum, the comparator 35 receives input signals from a summing amplifier 36 and a reference signal source 37. The summing amplifier 36 receives and sums the output signals from all the audio detectors 30, via resistors R9, thereby producing an output signal which is proportional to the number of transmit lines that are active at any given time. This signal is supplied to the comparator 35 where it is compared with a reference signal generated by the source 37 and representing the preselected maximum number of voice-actuated switches 13 that can be closed at any given time.

As long as the signal from the summing amplifier 36 remains below the level of the reference signal from the source 37, the comparator 35 produces an enabling binary "1" signal to the AND gate 34. However, when the output signal from the summing amplifier 36 exceeds the reference signal, the comparator 35 produces a binary "0" signal which disables the AND gate 34 to prevent any further clocking of the register 31. As long as clocking of the register 31 is prevented, the status of the switches 13 cannot be changed. Consequently, regardless of how many additional audio signals are produced at the stations 10, no further switches 13 can be closed until termination of one of the audio signals passing through a previously closed switch.

Upon termination of one of the audio signals passing through a closed switch 13, the output from the corresponding audio detector 30 changes to a binary "0". At the same time the output signal of the summing amplifier 36 drops below the level of the reference signal, and the comparator 35 again produces an enabling binary "1" signal to the AND gate 34. Then when a new audio signal appears on any of the transmit lines T1, T2 . . . Tn, the output of the corresponding detector 30 changes from a "0" to "1" to trigger the corresponding multivibrator 32, and the resulting pulse is fed through the OR gate 33 and the AND gate 34 to clock the register 31. This opens the switch 13 in the line in which the audio signal is terminated, and closes the switch 13 in the line carrying the new audio signal by transferring the respective "1"'s and "0"'s from the detectors 30 through the register 31 to the corresponding switches 13.

In FIG. 3 there is shown an exemplary circuit comprising one of the audio detectors 30. An audio signal from one of the transmit lines T1, T2 . . . Tn is fed through a resistor R10 to the inverting input of an operational amplifier 38 whose gain is determined by a feedback resistor R11. The output of the amplifier 38 is passed through an integrator formed by a diode D1 and a capacitor C1 to generate a signal whose voltage level increases with increasing amplitude of the audio input signal. More specifically, the diode D1 rectifies the output of the amplifier 38, and charges the capacitor C1 to a predetermined voltage level. This integrated signal is applied to the inverting input of a comparator 39 which receives a reference signal at its non-inverting input from a voltage divider comprising resistors R13 and R14.

When the voltage across the capacitor C1 becomes more positive than the reference voltage supplied to the comparator 39, the output of the comparator goes from high to low. This quickly discharges a capacitor C2 (which has been previously charged by the high output of the comparator 39) through a diode D2. As the capacitor C2 discharges, it turns on a transistor Q1 with current flowing from the base of the transistor Q1 through a resistor R16 and a zener diode D3. The resulting current flow through the emitter-collector circuit of the transistor Q1 produces a voltage drop across a resistor R17 which is the binary "1" output signal, or "audio flag," from the audio detector 30. It should be noted that the threshold at which the illustrative audio detector will present a binary "1" at its output is determined by the gain of the amplifier 38 and the values of the resistors R13 and R14 (which determine the level of the reference signal supplied to the comparator 39).

When the audio signal is removed from the input of the amplifier 38, the capacitor C1 discharges through a resistor R12. As the voltage at the capacitor C1 becomes more negative than the reference voltage supplied to the comparator 39, the output of the comparator 39 goes high, and the capacitor C2 recharges slowly through the resistor R15. When the voltage at the capacitor C2 becomes sufficiently high to turn off the transistor Q1, current flow through the emitter-collector circuit of the transistor Q1 is terminated, and the output of the audio detector 30 changes from a binary "1" to "0". the zener diode D3 ensures that the transistor Q1 is turned off when the output of the comparator 39 is high.

It can be seen that the illustrative audio detector provides "fast attack" and "slow release". That is, the presence of an audio signal changes the output of the audio detector from a binary "0" to "1" much faster than the termination of the audio signal changes the output from a "1" to a "0", because the capacitor C2 discharges rapidly through the diode D2 but charges more slowly through the resistor R15. This fast-attack/slow-release feature is desirable to avoid chopping off a portion of the audio signal at either the beginning or the end of the signal.

One of the particularly useful advantages of the conference system provided by this invention is the ease with which it can be expanded to accommodate additional conference stations. This advantage is illustrated by the system shown in FIG. 4, which also includes a more detailed circuit diagram of the inputs to the comparator 35.

The system of FIG. 4 includes a "master" set of conference stations 10 coupled through a bridge 11 in the same manner described above in connection with FIGS. 1 and 2. This "master" set of conference stations is interconnected with a similar set of "slave" conference stations 10' which are coupled through a conference bridge 11 in the same manner as the "master" set of stations except for certain modifications in the control circuit. More specifically, the output of the summing amplifier 36' associated with the "slave" stations is not connected to a comparator, but rather is connected to the input of the master summing amplifier 36 through an amplifier 40. This amplifier 40 adjusts the voltage level of the output from the slave summing amplifier 36' so that it corresponds to the level of an identical number of input signals to the master summing amplifier 36. That is, the level of the output from the slave summing amplifier 36' is increased so that the signals from the audio detectors 30' in the slave system have exactly the same effect on the master summing amplifier 36 as the outputs from the audio detectors 30 in the master system. Consequently, the output of the master summing amplifier 36 represents the total number of audio signals being transmitted in both the master and slave systems. This output signal from the master summing amplifier 36 is supplied via resistor R18 to the comparator 35, where it is compared with a reference signal derived from a reference voltage source Vr via a voltage divider comprising resistors R19 and R20.

As explained previously, the output of the comparator 35 indicates whether the number of audio signals being transmitted is above or below the preselected maximum at any given time. In the particular system illustrated in FIG. 4, the output of the comparator 35 indicates whether the total number of audio signals being transmitted in both the master and slave sets of conference stations is above or below a preselected maximum for the entire combined system. It is necessary that this single limit be set for the entire system because the two conference bridges 11 and 11' must nbe interconnected so that audio signals generated at the stations in the master set are transmitted to the stations in the slave set, and vice versa. Thus, the "limiting" output from the comparator 35 is supplied to both the AND gates 34 and 34' which control the clocking of the registers 31 and 31' in the control systems for the two sets of conference stations. In order to clock both these registers 31 and 31' in response to a clocking pulse from either AND gate 34 or 34', the outputs of the two AND gates are supplied to an OR gate 41 which has its output connected to the clock inputs of both registers 31 and 31'. Consequently, the appearance of a new audio signal from either set of conference stations 10 or 10' (while the number of closed switches 13 and 13' is still below the preselected maximum) clocks both registers 31 and 31'.

To interconnect the two bridges 11 and 11', a pair of switches S1 and S2 (see FIG. 2) in the slave bridge 11' are opened. The opening of switch S1 connects the output of the summing amplifier 23 in the slave bridge 11' to the input of the amplifier 24 in the master bridge 11 via line 50, thereby summing the outputs of the summing amplifiers 23 in the two bridges. Opening switch S2 in the slave bridge 11' connects the output of the amplifier 24 in the master bridge 11 to the voltage-follower amplifier 25 in the slave bridge 11' via line 51, so that the sum of all the incoming signals from both bridges is supplied to all the differential amplifiers 21 in both bridges. It will be understood that the lines 50 and 51 from the two bridges must be connected to each other.

As can be clearly seen from the combined system of FIG. 4, a few simple modifications and interconnections between the control systems for two different sets of conference stations permits those stations to be easily integrated into a single conference system. Furthermore, this expansion of the number of conference stations, and corresponding conference ports in the bridge, can be continued indefinitely without altering the substantially zero loss across the input and output terminals of each and every conference port, and without producing singing or otherwise degrading the quality of the signals being transmitted through the conference bridge.

We claim as our invention:

1. A telephone conference system comprising
   a telephone conference bridge for coupling multiple conference ports, said bridge comprising
   means for summing incoming signals from all the conference ports and supplying the summed signals to all the conference ports, and
   a plurality of differential amplifiers each of which is connected to one of the conference ports and differentially receives (1) incoming signals at the corresponding conference port and (2) the output of said summing means so as to cancel from the output of said summing means any signal received by said summing means from said corresponding conference port, whereby each differential amplifier passes only that portion of the output of said summing means that is received from conference ports other than the particular conference port to which that differential amplifier is connected,
   a plurality of voice-actuated switches each of which is connected to one of said conference ports for controlling the transmission of incoming audio signals to the respective ports, and
   limiting means connected to said switches and responsive to the audio signals transmitted to all the conference ports for limiting the number of said switches that can be closed at the same time to a preselected maximum, while permitting the continuous transmission of outgoing audio signals from all said ports.

2. A telephone conference system comprising a conference bridge as set forth in claim 1,
   a plurality of conference stations,
   a plurality of voice-actuated switching means each of which is connected between one of said conference stations and the input terminal of the corresponding conference port for controlling the transmission of incoming audio signals to the respective ports,
   means for closing each of said switching means in response to the commencement of an audio signal from the conference station connected thereto, and
   means for opening the closed switching means in response to commencement of an audio signal from another conference station in the absence of an audio signal from the conference station connected to the closed switching means.

3. A telephone conference system as set forth in claim 2 which includes limiting means responsive to audio signals from all the conference stations for disabling said closing means for all open switching means when audio signals are being transmitted from a preselected maximum number of the conference stations.

4. A telephone conference system as set forth in claim 2 which includes a first set of transmit lines associates with a first set of switch closing means, and a second set of transmit lines associated with a second set of switch closing means,
   audio detecting means connected to each transmit line for generating a digital signal in response to the presence of an audio signal on the corresponding transmit line,
   first and second summing means for summing the digital signals from the converters connected to the two sets of transmit lines to produce signals respresenting the number of transmit lines on which audio signals are present,
   a reference signal generator for generating a reference signal representing a preselected maximum number of transmit lines on which audio signals are permitted to be present at the same time,
   first and second gates for transmitting said digital signals from the converters connected to the two sets of transmit lines to the two sets of switch closing means, and
   limiting means responsive to the output signals from both summing means and to said reference signal for generating a master limit signal for disabling both said first and second gates when the total number of transmit lines on which audio signals are present exceeds said preselected maximum.

5. A telephone conference system as set forth in claim 3 wherein said preselected maximum number of conference stations is less than the number of stations that is capable of rendering said conference bridge unstable.

6. A telephone conference system comprising
a plurality of conference stations,
a conference bridge including a plurality of conference ports each having an input terminal for receiving signals from one of said conference stations and an output terminal for transmitting signals to said conference station from all the other conference stations, said bridge also including means for coupling signals received at the input terminal of any of said conference ports to the output terminals of all the conference ports except the port where the signal is received,
a plurality of voice-actuated switching means each of which is connected between one of said conference stations and the input terminal of the corresponding conference port for controlling the transmission of incoming audio signals to the respective ports,
means for closing each of said switching means in response to the commencement of an audio signal from the conference station connected thereto, and
limiting means responsive to signals from all the conference stations for disabling said closing means for all open switching means when signals are being transmitted from a preselected maximum number of the conference stations.

7. A telephone conference system as set forth in claim 6 which includes
means for opening the closed switching means in response to commencement of an audio signal from another conference station in the absence of an audio signal from the conference station connected to the closed switching means.

8. A telephone conference system as set forth in claim 6 wherein said preselected maximum number of conference stations is less than the number of stations that is capable of rendering said conference bridge unstable.

9. A telephone conference system comprising
a telephone conference bridge for coupling multiple conference ports, said bridge comprising
means for combining incoming signals from all the conference ports and supplying the combined signals to all the conference ports, and
cancelling means associated with each conference port for cancelling from said combined signals any signals received at that particular port, whereby the signals transmitted from each port are only that portion of the combined signals that are received from the other conference ports,
a plurality of voice-actuated switches each of which is connected to one of said conference ports for controlling the transmission of incoming audio signals to the respective ports, and
limiting means connected to said switches and responsive to the audio signals transmitted to all the conference ports for limiting the number of said switches that can be closed at the same time to a preselected maximum, while permitting the continuous transmission of outgoing audio signals from all said ports.

* * * * *